Dec. 1, 1931.  T. VEITCH  1,834,439
SHOCK ABSORBER
Filed Oct. 31, 1928
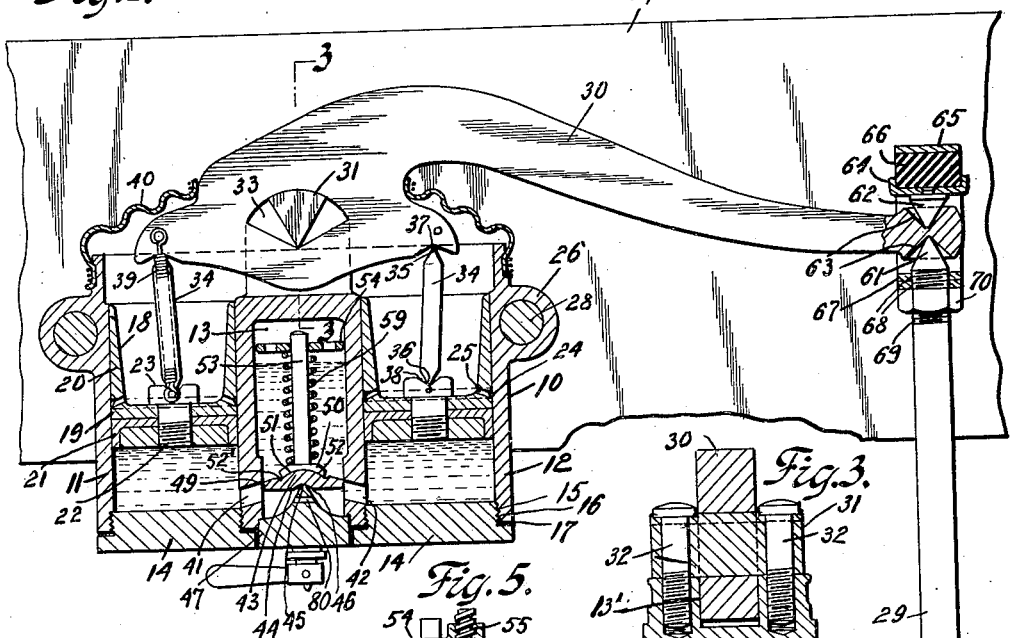
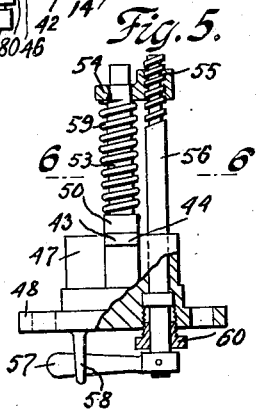
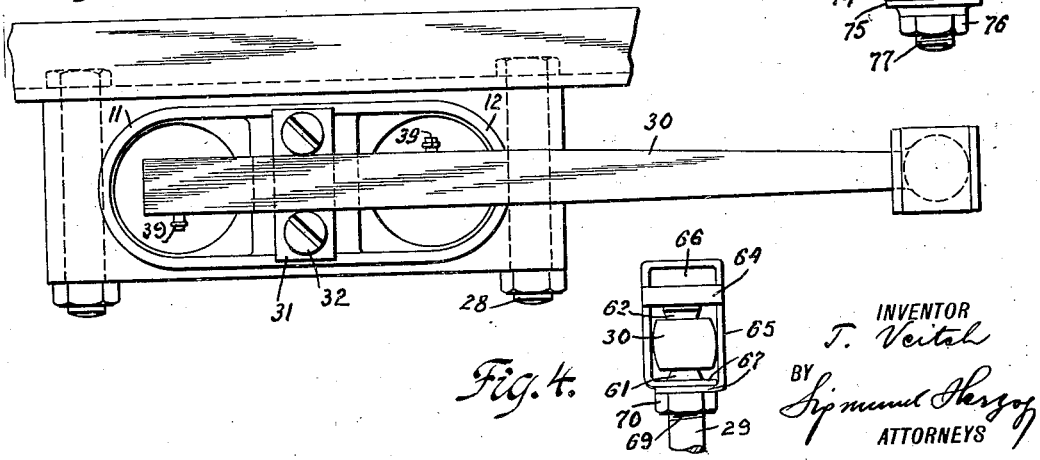
INVENTOR
T. Veitch
BY
Sigmund Herzog
ATTORNEYS Patented Dec. 1, 1931

1,834,439

UNITED STATES PATENT OFFICE

THOMAS VEITCH, OF DARIEN, CONNECTICUT, ASSIGNOR, BY DIRECT AND MESNE ASSIGNMENTS, TO VEITCH-PEREZ PARTS CORPORATION, OF NEW YORK, N. Y., A CORPORATION OF NEW YORK

SHOCK ABSORBER

Application filed October 31, 1928. Serial No. 316,316.

The present invention relates to improvements in hydraulic or fluid operating shock absorbers, and more particularly to those of double action. More specifically, the invention pertains to shock absorbers adapted for use on vehicles in general and specifically on motor cars or automobiles. The invention has reference to that type of shock absorbing devices, in which a pair of interconnected pistons operate in two cylinders containing a suitable liquid and communicating through ports with a supply reservoir, the liquid being alternately forced from one cylinder into said reservoir and received from the latter in the other cylinder.

Devices of this type are old and well-known. Their most objectionable feature is that they comprise too many working parts, and require precision work and expensive materials in their manufacture and assembling. All of the same employ packings or glands for the main operating parts. Furthermore, all of the same are so constructed that right and left-hand devices are needed in equipping a vehicle with a set of the same. Their adjustments from minimum to maximum loads are difficult to make, and at that they are adapted to be easily thrown out of gear in the operation of the mechanism. In all of the devices heretofore in use liquids are employed the viscosity of which varies with the changes of temperature ordinarily encountered in the operation of the shock absorber, with the consequent change of the adjustment of the latter.

The main object of the present invention is to provide a hydraulic shock absorber which is exceedingly simple in construction, the number of its operating elements being reduced to a possible minimum; and which requires no precision work nor expensive materials in its manufacture and assembling.

Another object of the invention is to so construct the improved shock absorber that the use of packings or glands for the main operating parts thereof is entirely done away with.

A further object of the invention is to so design the shock absorber that it may be used either as a right-hand device or as a left-hand device, that is to say it may be mounted between the relatively movable elements of a vehicle in all locations or positions where it may be required.

A still further object of the invention is to provide a device of the character specified which may be conveniently adjusted to different loads and other requirements, the adjusting means being so designed that they may be readily fixed or secured against derangement.

A further object of the invention is to provide a device of the type referred to which is so constructed and designed that it allows of the employment of a liquid the viscosity of which does not change with the variation of temperatures ordinarily met in the operation thereof, thus doing away with the necessity of adjusting the working parts thereof to meet temperature changes.

Another object of the invention is to provide a hydraulic shock absorber which positively checks and reduces to a minimum all jars and jerks suddenly transmitted to vehicle axles, and, incidentally, allows any excessive pressure, due to sudden compressive action upon the liquid within the cylinders, to be gradually relieved.

A still further object of the invention is to provide a device of the type mentioned which is double acting and offers little restraining action at slow oscillating speeds.

Still a further object of the invention is to so construct the improved shock absorber that the possibility of producing twisting strains is eliminated, all strains and reactions being in a single plane.

A further object of the invention is to so design the shock absorber that entrained air bubbles cannot interfere with the correct action thereof; any air separating from the operating fluid being confined or trapped in a neutral chamber or reservoir.

Another object of the invention is to produce a shock absorber of the type mentioned which lacks ball or contact valves, so that pounding and the consequent telegraphing of noises by the shock absorber to the vehicle chassis is prevented.

Still another object of the invention is to design a non-lubricated universal joint between the shock absorber and the vehicle axle.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a central vertical section taken through a shock absorber constructed in accordance with the present invention, the same being shown mounted on the relatively movable parts of a vehicle; Fig. 2 is a top plan view thereof; Fig. 3 is a section taken on line 3—3 of Fig. 1; Fig. 4 is an end view of the universal joint between the shock absorber lever-arm and the axle-engaging link of the construction; Fig. 5 is an elevation, partly in section, of the single valve mechanism of the shock absorber; and Fig. 6 is a section taken of line 6—6 of Fig. 5.

In the drawings, the numeral 10 indicates a casing, constructed to form a pair of cylinders 11 and 12 which are arranged side by side in the same plane and have disposed therebetween a chamber 13, with which the said cylinders are adapted to communicate in a manner hereinafter to be described. The cylinders are open at their upper ends, their lower ends being closed by heads 14 which, in the embodiment illustrated in the drawings, are in the form of separate elements, although this is not essential. In the embodiment illustrated in the drawings each head 14 has a reduced threaded portion 15, meshing with interior threads 16 in the lower end of the respective cylinder, a gasket 17 being interposed between the head and the lower end of the respective cylinder, for the well-known purpose. Within each cylinder operates a suitable piston 18, in the case illustrated a trunk piston. The head 19 of each piston is arranged lowermost and above the said head extends a skirt 20 of the usual construction. Each piston is provided with a packing, for instance a flexible cup-ring packing 21, for the well-known purpose. These cup-rings may be held in position upon the pistons in any suitable manner, the elements being united, in the case illustrated, by screw-bolts 22, the heads 23 of which is disposed within the skirt of the respective pistons.

Each piston is provided above the packing with an oil-wiping groove 24, the latter being connected with the inside of the piston by a series of holes 25.

The casing 10 carries perforated attached lugs 26, which are oppositely disposed and adapted to fit against the frame 27 of the vehicle, to be secured thereto by means of bolts 28.

The shock absorber restraining force is transmitted from the pistons 18 to the axle-engaging link 29 by an arm 30, which oscillates in a plane extending through the cylinder centers. The said arm is fulcrumed on a knife-edged bar 31, which is attached, for instance, by screw bolts 32 to the casing 10 directly over the chamber 13 above referred to. As clearly shown in the drawings, the bar 31 is sector-shaped in transverse cross section and extends through a similarly shaped aperture 33 in the arm 30, the said aperture being of a size exceeding that of the bar to admit swinging of the arm 30 on said bar. A portion of the arm, below the aperture 33, fits snugly into a recess 13' in the top of the chamber 13, whereby the said arm is held against lateral movement on the casing 10. The radii of the knife-edged bar 31 and the aperture 33 are the same, so that the arm 30 is held on the knife edge against vertical movement, being, however, permitted to swing thereon.

The connection between the arm 30 and the two pistons of the device is made by two links 34. The ends of each link are knife-edged, as indicated at 35 and 36, the knife-edges 35 engaging V-shaped grooves 37 in the arm 30, and the knife-edges 36 being seated in V-shaped grooves 38 in the screw-heads 23 on the pistons. The V-shaped grooves 37 are arranged on opposite sides of the fulcrum of the arm 30 and in substantial alignment with the piston centers. The pistons are raised on their suction strokes by springs 39, one spring being associated with each link 34. Each spring is connected to the arm 30 near the point of engagement of the respective link with said arm, and at its other end to the respective screw head 23 adjacent the point of engagement of the link with the screw head.

In order to exclude dust, mud and other foreign matter from the shock absorber, a flexible boot 40, of leather, fabric, or the like, is secured to the top of the cylinder casing 10 and around the lever 30, above the fulcrum of the latter.

The cylinders 11 and 12 communicate with the chamber 13 through ports 41 and 42, respectively, said ports being disposed as close as possible to the cylinder heads 14 above referred to. With the ports co-operates a valve mechanism 43 for controlling the flow of fluid from the cylinders to the central chamber 13 and from the latter to said cylinders. This valve mechanism is disposed in the chamber 13 and comprises a valve 44 of substantially oblong configuration, extending across said chamber from port to port, the latter being disposed in alignment with one another. The width of the valve exceeds, of course, that of an individual port. The valve is adapted to rock on a knife-edge 45, it being for this purpose provided with a transversely extending central V-shaped groove 46, into which the last mentioned knife-edge extends, the arrangement being such that the said valve is disposed horizontally in its neutral position, shown in Fig. 1 of the drawings. The knife-edge 45 may be formed on a plug 47, which closes the lower end of the chamber 13, said plug being in the form of a flanged body, its flanges 48 bearing against the underface of the casing 10 and serving as the means for attaching the plug to said casing. In forming the knife-edge 45, the plug is milled out at diametrically opposite portions thereof and thereby forms a partition or dividing wall within the chamber 13 between the ports 41 and 42. The transverse edges 49 of the valve, which co-operate with the said ports, are reduced in thickness and the upper faces of the end portions of the said valve are disposed adjacent the upper edges of the ports 41 and 42, when the said valve is in its neutral position, shown in Fig. 1 of the drawings. A shoe 50, having a curved underface 51, rests on top of the valve 44, the curved underface of said shoe co-operating with a similarly curved upper face portion 52 of the valve. The shoe straddles the fulcrum of the valve and bears on knife edges 52'. These edges are inside of the center of effort of the fluid tending to lift the valve, so that the valve is rocked on its fulcrum instead of being bodily lifted therefrom. From the shoe extends upwardly a stem 53, the upper end of the latter projecting through a guide washer 54, which is in sliding engagement with the inner face of the chamber 13. This washer is provided with a screw-threaded hole 55, the threads of which mesh with those of a spindle 56, the latter being rotatably mounted in the plug 47. The lower end of the said spindle extends through the said plug and has fixed to it, outside of the casing 10, a lever 57 which co-operates with a stop 58, the latter projecting downwards from the plug and limiting the movement of the said lever, permitting it, however, to make one incomplete turn. About the stem 53 is coiled a spring 59, one end of which bears against the shoe 50 and its other end against the washer 54. The tension of this spring may be adjusted by turning the lever 57 in one or the other direction. Due to the co-operating curved faces 51 and 52 of the shoe 50 and valve 44, respectively, the said shoe, with the fluid, gives a dash-pot effect, to prevent a rap when the valve returns to neutral position. A stuffing box 60 is mounted on the plug 47, for co-operation with the spindle 56, for the well-known purpose.

Between the arm 30 and the axle-engaging link 29 is provided a universal joint. This joint comprises two opposed hardened conical bearing points 61 and 62, which are seated in two oppositely conical depressions 63 in the end of the arm 30. These depressions are separated by a relatively thin wall, as clearly appears from Fig. 1 of the drawings. The bearing point 61 is preferably formed on the upper end of the link 29, while the bearing point 62 is fixed to a slide 64, guided in a frame 65, which is carried by the link 29. A yielding block 66, of rubber or the like, is interposed between the frame 65 and the said slide for the purpose of keeping the conical bearing points firmly engaged with the end of the arm 30. The frame 65 may be of any suitable construction. In the case illustrated it is in the form of an oblong head, preferably made of a strip of metal with its ends 67 overlapping. Through these overlapping ends extend two registering screw-threaded holes 68, and with the threads of these mesh threads 69 on the link 29 below the bearing point 61. A lock nut 70, disposed below the overlapping ends of the frame, serves to keep the frame in proper position on the said link. The threaded connection between the frame and the link 29 provides also for adjustment of the frame on said link.

The link 29 is connected to the axle 71 of the vehicle in such a manner that a slight swinging movement of the link in relation to the axle is permitted. In order to attain this end a suitably shaped plate member 72 is fastened to said axle, the said plate being provided with an opening 73 through which the link 29 is extended. Above and below the said plate are arranged on the link resilient blocks or buffers 74, held between washers 75. Nuts 76, meshing with threads 77 on the link 29, keep the elements in assembled positions. The plate member 72 may be attached to the axle 71 in a suitable manner. In the embodiment of the invention illustrated in the drawings, the said plate member is provided with side flanges 78, which are shaped to engage one of the longitudinal edges of the vehicle axle and extend below the same in abutment with the under-face of the axle. A clamping bolt 79, carried by the said plate member, engages the opposite longitudinal edge of the axle.

Before describing the operation of the shock absorber, attention is called to the fact that the ports 41 and 42 are large compared with the areas of the pistons. The purpose of this arrangement is to prevent building up of greater pressures than predetermined by the valve spring 59, which would obviously be the case if the vehicle axles received a violent shock at high speeds of the vehicle and said ports were unduly restricted. A bypass hole 80 may be provided in the plug 47 below its knife-edge portion, if less restriction is required at slow speeds.

The operation of the improved mechanism is as follows: The cylinders and the chamber 13 are filled with a suitable operating fluid. The said chamber constitutes a non-pressure supply reservoir, into which the fluid is discharged from one cylinder on the down or resisting stroke of the piston, and from which a full supply is simultaneously given to the other cylinder on the suction stroke of a piston, as will more clearly appear hereinafter. This chamber is not filled completely with liquid, an air space being provided above the fluid level therein. Inasmuch as the main operating elements of the device are not associated with stuffing boxes or the like, it is obvious that the device herein described is adapted to contain working fluids of relatively low viscosity, such as kerosene or the like, with the result that the means controlling the flow of the fluid to and from the central supply reservoir needs no adjustment and functions properly with surrounding temperature changes from extreme summer heat to very low temperatures of winter weather.

Since the arm 30 is connected to the axle of the vehicle and the cylinders are mounted upon the chassis thereof, it is obvious that the pistons in the cylinders move at all times in opposite directions, that is to say when one piston is on its compression stroke, the other piston is on its suction stroke. Consequently, when one piston forces fluid from its cylinder into the central chamber 13, the other piston causes a flow of fluid from the said central chamber into the cylinder with which it co-operates. The flow of the fluid is controlled by the spring-pressed single valve 44, which is held in all positions of rest of the relatively movable elements of the vehicle in closing position by the adjustable spring 59 above referred to. In its port-closing position, the valve is horizontally disposed but does not make a sealed metal to metal closure. Considering now the operation of said valve, it is evident that, on the compression stroke of a piston in its cylinder, the fluid flowing through the respective port into the central supply chamber swings the said valve on its fulcrum so that the adjacent transverse edge portion of the valve is lifted and the opposite transverse edge portion thereof is lowered. Both ports of the structure are therefore simultaneously opened. However, inasmuch as the upper face of the valve is in its neutral, horizontal position disposed substantially flush with the upper longitudinal edges of the ports, that port which is connected with the compression cylinder will open slower than that port which is connected with the suction cylinder. In other words, the suction port is always of greater area than the discharge port, so that no partial vacuum can be created in the suction cylinder and consequently the danger of the suction piston drawing in air is eliminated. Whatever air may be entrained in the operating fluid is separated in the central chamber therefrom, rises to the top of the fluid in the chamber and does not enter the suction cylinder.

The spring 59, acting on the valve, is initially set for normal load conditions. Adjustments thereof may be made in the manner above described. This spring controls the movement of the valve, it interposing a resistance to the flow of the working fluid from the compression cylinder into the central chamber of the device, and its resistance, obviously, increases as it is being compressed.

In Fig. 1 of the drawings, the elements of the shock absorber are shown in the positions which they occupy when there is no live load on the vehicle. When a vehicle is being loaded, obviously the springs thereof are somewhat compressed, that is to say the chassis approaches somewhat the vehicle axles. The arm 30 is thereby swung upwards on its fulcrum and consequently one piston is somewhat lowered and the other raised a corresponding distance. The valve 44 is thereby first swung in the manner above described on its knife-edge fulcrum, but returns to its normal horizontal position as soon as the movement of the pistons ceases. The spring 59, co-operating with the valve, returns thus to its normal, expanded condition, or, in other words, it resumes its original resistance. When the vehicle is in motion and its relatively movable elements, that is to say its chassis and axles, either approach one another or recede from one another, due to inequalities in road, the axle engaging link 29 moves correspondingly, and causes, by the intermediary of the lever 30, one of the pistons to move on its compression stroke and the other piston on its suction stroke. The valve offers resistance to the flow of the fluid from the compression cylinder into the central chamber 13 and thereby offers resistance to the movement of the piston in the last named cylinder, with the result that the relative movement between the chassis and vehicle axles is gradually checked and the shocks are, in a similar manner, absorbed. As soon as these relatively movable elements come to a full stop, the valve 44 returns to its normal horizontal position, so that on the rebound of the vehicle springs the shock absorber functions in exactly the same manner in which it acted on the previous strokes of the piston, with the exception that the functions of these pistons are reversed, that is to say the piston which acted on the previous stroke as the suction piston now becomes the compression piston, and vice-versa. From this it appears that the device herein described offers the same resistance to the movement of the sections of the vehicle springs toward and away from one another. It is to be noted, however, that the resistance offered to the flow of the fluid from any cylinder into the central chamber increases gradually as the spring 59 is being compressed in the movement of the pistons in either direction and from any position of rest of the same. For this reason the relative movement between the chassis and vehicle axles is checked gradually irrespective of the live load conditions on the vehicle and irrespective of the amplitude of the movement. Of course little resistance is offered by the spring 59 at small amplitudes of movement, so that a comparatively free movement of the vehicle springs is permitted when the vehicle runs over a comparatively smooth road. In other words, the device herein described does not tend to stiffen the vehicle springs. The by-pass hole 80, above described, aids in this direction.

Attention is called to the fact that a suitable quantity of operating fluid may be placed into each of the pistons of the device. This provides a liquid seal for the pistons. Obviously, if the pistons have a tendency to suck air into the cylinders, the fluid within said pistons, being in communication through the holes 25 with the grooves 24, provides an airtight closure, so that operating fluid is drawn into the cylinders instead of air.

It is obvious that, inasmuch as the valve spring adjusting means is disposed on the bottom of the casing 10, it does not interfere with mounting of the shock absorber on the chassis at any point of the latter. These devices can, therefore, be used as right- or left-hand devices, both faces of the casing being adapted to abut against the frame 27.

Attention is called to the fact that the lever 30 extends through the longitudinal axes of the two pistons, so that the possibility of producing twisting strains is eliminated, all strains and reactions being in single plane.

It will be seen from the foregoing that the improved shock absorber comprises exceedingly few working parts, and requires no precision work nor expensive materials in its manufacture and assembling. The single adjusting means, that is to say the spindle 56, is readily accessible and may be conveniently set to adapt the shock absorber to different loads and other requirements, and the stop 58 prevents the adjusting means from being thrown out of gear.

Attention is also called to the fact that the universal joint between the arm 30 and the link 29 does not require lubrication. If the elements thereof wear in time, the frame 65 and the elements thereon may be readily reset on the link 29 to meet the requirements.

What I claim is:

1. A shock absorber, comprising a pair of cylinders, a closed fluid containing reservoir communicating with said cylinders, a pair of connected oppositely reciprocating pistons in said cylinders, each piston acting at one stroke thereof to force fluid from its cylinder into said reservoir and at its other stroke causing transference of fluid from said reservoir into its cylinder, and a single valve within said reservoir for controlling the communications between said reservoir and said cylinders.

2. In a shock absorber according to claim 1, said valve closing said communications in all positions of rest of said pistons.

3. In a shock absorber according to claim 1, said valve offering a gradually increasing resistance to the flow of the fluid from a cylinder into said reservoir from any position of rest of said pistons.

4. In a shock absorber according to claim 1, said valve offering a gradually increasing resistance to the flow of the fluid from a cylinder into said reservoir from any position of rest of said pistons and in either direction of movement of the latter.

5. A shock absorber, comprising a pair of cylinders, a closed fluid containing reservoir communicating through two ports with said cylinders, a pair of connected oppositely reciprocating pistons in said cylinders, each piston acting at one stroke thereof to force fluid from its cylinder through the respective port into said reservoir and on its other stroke causing transference of fluid from said reservoir through said port into its cylinder, and a single valve within said reservoir co-operating with said ports.

6. In a shock absorber according to claim 5, said valve being so arranged in relation to said ports that the port through which fluid flows from a cylinder into said reservoir is at all times more restricted than the other port.

7. In a shock absorber according to claim 5, said valve being so arranged in relation to said ports as to permit flow of fluid from said reservoir into a cylinder at a greater rate than the flow of fluid from a cylinder into said reservoir.

8. In a shock absorber according to claim 5, said valve controlling the communications between said reservoir and said cylinders and being in closing position at all positions of rest of said pistons.

9. A shock absorber, comprising a pair of cylinders, a closed fluid containing reservoir communicating through two ports with said cylinders, a pair of connected oppositely reciprocating pistons in said cylinders, each piston acting at one stroke thereof to force fluid from its cylinder through the respective port into said reservoir and on its other stroke causing transference of fluid from said reservoir through said port into its cylinder, and a single rocking valve within said reservoir co-operating with said ports.

10. A shock absorber according to claim 5, comprising a spring acting upon said valve.

11. A shock absorber according to claim 5, comprising a spring acting upon said valve, and means for adjusting the tension of said spring, the actuating element of said adjusting means being disposed outside of said reservoir.

12. A shock absorber according to claim 9, comprising a spring acting upon said valve.

13. A shock absorber according to claim 9, comprising a spring acting upon said valve, and means for adjusting the tension of said spring, the actuating element of said adjusting means being disposed outside of said reservoir.

14. A shock absorber, comprising a pair of cylinders, a closed fluid containing reservoir communicating through two ports with said cylinders, said ports being disposed on opposite portions of said reservoir, a pair of connected oppositely reciprocating pistons in said cylinders, each piston acting at one stroke thereof to force fluid from its cylinder through the respective port into said reservoir and on its other stroke causing transference of fluid from said reservoir through said port into said cylinder, and a single rocking valve within said reservoir co-operating with said ports, said valve when closing the communication between said reservoir and said cylinders being disposed within the areas of said ports so that the port through which fluid flows from said reservoir into a cylinder is less restricted in the operation of said valve than the port through which fluid flows from the other cylinder into said reservoir.

15. A shock absorber according to claim 14, comprising a spring acting upon said valve, and means for adjusting the tension of said spring, the actuating means of said adjusting means being disposed outside of said reservoir.

16. A shock absorber, comprising a pair of cylinders, a closed fluid containing reservoir communicating through two ports with said cylinders, said ports being disposed in opposite portions of said reservoir, a pair of connected oppositely reciprocating pistons in said cylinders, each piston acting at one stroke thereof to force fluid from said cylinder through the respective port into said reservoir and on its other stroke causing transference of fluid from said reservoir through said port into its cylinder, a knife-edged fulcrum within said reservoir, and a single valve rocking on said fulcrum co-operating with said ports, said valve when closing the communication between said reservoir and said cylinders being disposed within the areas of said ports so that the port through which fluid flows from said reservoir into a cylinder is less restricted in the operation of said valve than the port through which fluid flows from the other cylinder into said reservoir.

17. A shock absorber according to claim 16, comprising means co-operating with said valve for preventing the same from rising from said fulcrum but permitting swinging movement thereon.

18. In a shock absorber according to claim 16, the element on which said fulcrum is formed being provided with a hole permitting communication between said ports.

19. A shock absorber, comprising a pair of cylinders, a closed fluid containing reservoir disposed between said cylinders and communicating therewith, a pair of pistons reciprocatably arranged in said cylinders, a lever fulcrumed to said reservoir and being located in a plane passing through the longitudinal axes of said cylinders, connections on opposite sides of the lever fulcrum between said lever and said pistons, whereby the latter reciprocate in opposite directions when said lever swings on said fulcrum, each piston acting at one stroke thereof to force fluid from its cylinder into said reservoir and at its other stroke causing transference of fluid from said reservoir into its cylinder, and a single valve within said reservoir for controlling the communications between said reservoir and said cylinders.

20. A shock absorber, comprising a pair of cylinders, a closed fluid containing reservoir disposed between said cylinders and communicating therewith, a pair of pistons reciprocatably arranged in said cylinders, a lever fulcrumed to said reservoir and being located in a plane passing through the longitudinal axes of said cylinders and extended beyond said reservoir for connection with an axle engaging link, connections on opposite sides of the lever fulcrum between said lever and said pistons, whereby the latter reciprocate in opposite directions when said lever swings on said fulcrum, each piston acting at one stroke thereof to force fluid from its cylinder into said reservoir and at its other stroke causing transference of fluid from said reservoir into its cylinder, and means for controlling the communications between said reservoir and said cylinders, said connections including each a link interposed between said lever and the respective piston, and a spring connecting the piston with said lever.

21. A shock absorber, comprising a pair of cylinders, a closed fluid containing reservoir disposed between said cylinders and communicating therewith, a pair of pistons reciprocatably arranged in said cylinders, a lever fulcrumed to said reservoir and being located in a plane passing through the longitudinal axes of said cylinders and extended beyond said reservoir for connection with an axle engaging link, connections on opposite sides of the lever fulcrum between said lever and said pistons, whereby the latter reciprocate in opposite directions when said lever swings on said fulcrum, each piston acting at one stroke thereof to force fluid from its cylinder into said reservoir and at its other stroke causing transference of fluid from said reservoir into its cylinder, and means for controlling the communications between said reservoir and said cylinders, said connections including each a link provided on both ends with knife-edges seated in V-shaped notches in said lever and the respective piston, and a spring connecting the piston with said lever.

22. A shock absorber according to claim 1, comprising means for by-passing fluid from one cylinder to the other.

23. A shock absorber, including a liquid carrying cylinder, a trunk piston working in said cylinder against the body of liquid therein, said piston being arranged with its head lowermost in said cylinder, a peripheral groove in the outer face of said piston, said groove communicating with the interior of said piston above the head of the latter, whereby part of the working liquid in said piston is adapted to form a liquid seal in said groove between the piston and the inner surface of the wall of said cylinder.

Signed at New York, in the county of New York, and State of New York, this 30th day of October, A. D. 1928.

THOMAS VEITCH.